(12) United States Patent
Taguchi et al.

(10) Patent No.: US 10,569,713 B2
(45) Date of Patent: Feb. 25, 2020

(54) VEHICLE MIRROR WITH IMAGE DISPLAY FUNCTION

(71) Applicant: FUJIFILM Corporation, Tokyo (JP)

(72) Inventors: Takao Taguchi, Minamiashigara (JP); Kazuhiro Oki, Minamiashigara (JP); Mitsuyoshi Ichihashi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 45 days.

(21) Appl. No.: 15/935,642

(22) Filed: Mar. 26, 2018

(65) Prior Publication Data

US 2018/0215316 A1  Aug. 2, 2018

Related U.S. Application Data

(63) Continuation of application No. PCT/JP2016/075960, filed on Sep. 5, 2016.

(30) Foreign Application Priority Data

Sep. 30, 2015  (JP) ................. 2015-193071

(51) Int. Cl.
*G02B 27/14* (2006.01)
*B60R 1/12* (2006.01)
*B60R 1/04* (2006.01)
*B60R 1/00* (2006.01)

(52) U.S. Cl.
CPC ............. *B60R 1/12* (2013.01); *B60R 1/00* (2013.01); *B60R 1/04* (2013.01); *G02B 27/144* (2013.01); *B60R 2001/1215* (2013.01); *B60R 2001/1253* (2013.01)

(58) Field of Classification Search
CPC ........................................ B60R 1/12
USPC ...................................... 359/629
See application file for complete search history.

(56) References Cited

U.S. PATENT DOCUMENTS

2007/0279756 A1* 12/2007 Rosario ............... B60R 1/12
  359/633
2008/0252833 A1* 10/2008 Nieuwkerk .......... B60R 1/088
  349/115
2014/0300979 A1 10/2014 Tomida et al.
2015/0293390 A1 10/2015 Tsunekawa
2016/0216414 A1 7/2016 Ichihashi et al.

FOREIGN PATENT DOCUMENTS

| JP | 2003-176158 A | 6/2003 |
|---|---|---|
| JP | 2003-315548 A | 11/2003 |
| JP | 2009-506928 A | 2/2009 |
| JP | 2011-45427 A | 3/2011 |
| JP | 2012-98649 A | 5/2012 |
| JP | 2014-26058 A | 2/2014 |
| JP | 2014-112185 A | 6/2014 |
| JP | 2014-201146 A | 10/2014 |
| JP | 2014-202928 A | 10/2014 |
| JP | 2015-223831 A1 | 12/2015 |
| WO | WO 2005/045481 A1 | 5/2005 |
| WO | WO 2006/045368 A1 | 5/2006 |
| WO | WO 2015/050203 A1 | 4/2015 |

OTHER PUBLICATIONS

Japanese Decision of Refusal for corresponding Japanese Application No. 2015-193071, dated Mar. 19, 2019, with English translation.
Japanese Office Action dated Dec. 11, 2018, for corresponding Japanese Application No. 2015-193071, with an English translation.
Extended European Search Report for European Application No. 16851038.6, dated May 29, 2018.
International Preliminary Report on Patentability and Written Opinion of the International Searching Authority(Forms PCT/IB/326, PCT/IB/373 and PCT/ISA/237), dated Apr. 12, 2018, for International Application No. PCT/JP2016/075960, with an English Translation of the Written Opinion.
International Search Report (Form PCT/ISA/210) for International Application No. PCT/JP2016/075960, dated Nov. 22, 2016 with English Translation.
Japanese Office Action for Japanese Application No. 2015-193071, dated Jun. 19, 2018, with an English translation.

* cited by examiner

*Primary Examiner* — James C. Jones
(74) *Attorney, Agent, or Firm* — Birch, Stewart, Kolasch & Birch, LLP

(57) ABSTRACT

A vehicle mirror with an image display function includes a half mirror and an image display device, the half mirror includes an nλ/4 retardation film and a reflection layer, n is 1, 3, 5, or 7, the nλ/4 retardation film, the reflection layer, and the image display device are disposed in this order in the mirror with an image display function, and the reflection layer is a linear polarization reflection layer or a circular polarization reflection layer.

14 Claims, No Drawings

VEHICLE MIRROR WITH IMAGE DISPLAY FUNCTION

CROSS-REFERENCE TO RELATED APPLICATIONS

This application is a Continuation of PCT International Application No. PCT/JP2016/75960, filed on Sep. 5, 2016, which claims priority under 35 U.S.C. § 119(a) to Japanese Patent Application No. 2015-193071, filed on Sep. 30, 2015. Each of the above application(s) is hereby expressly incorporated by reference, in its entirety, into the present application.

BACKGROUND OF THE INVENTION

1. Field of the Invention

The present invention relates to a vehicle mirror with an image display function.

2. Description of the Related Art

For example, in JP2014-201146A, a vehicle mirror with an image display function is described which is capable of displaying images such as images taken by a car-mounted camera on the vehicle mirror. In the vehicle mirror with an image display function disclosed in JP2014-201146A, a liquid crystal display device is provided inside a housing of the vehicle mirror to display an image through a half mirror provided on a front surface of the vehicle mirror, thereby realizing image display on the mirror.

SUMMARY OF THE INVENTION

The visible light transmittance of a half mirror is generally about 30% to 70%, and a configuration provided with a half mirror has a potential problem in that images become darker than in a configuration having no half mirror. In JP2011-45427A that discloses a mirror with an information display function which is applicable to a mirror for interior decoration purpose, cosmetic purpose, security purpose, or safety purpose, there is a description that light loss can be eliminated using a reflective polarizing plate as a half mirror. However, in a case where the present inventors have formed a mirror with an image display function using a reflective polarizing plate and used the mirror in a vehicle, brightness unevenness or color unevenness (iridescence) has been caused in a mirror-reflected image.

The present invention is contrived in view of the problem, and an object of the present invention is to provide a vehicle mirror with an image display function in which a bright image can be displayed and a mirror-reflected image having no unevenness can be observed.

The present inventors have conducted intensive studies in order to achieve the object, and found that the unevenness in the mirror-reflected image can be confirmed in a case where external scenery is observed through a rear glass of the vehicle. Based on this knowledge, the present inventors repeatedly conducted studies and completed the present invention.

That is, the present invention provides the following [1] to [10].

[1] A vehicle mirror with an image display function comprising: a half mirror; and an image display device, in which the half mirror includes an $n\lambda/4$ retardation film and a reflection layer, n is 1, 3, 5, or 7, the $n\lambda/4$ retardation film, the reflection layer, and the image display device are disposed in this order in the mirror with an image display function, and the reflection layer is a linear polarization reflection layer or a circular polarization reflection layer.

[2] The vehicle mirror with an image display function according to [1], in which n is 1 or 3.

[3] The vehicle mirror with an image display function according to [1] or [2], in which the reflection layer is a circular polarization reflection layer.

[4] The vehicle mirror with an image display function according to [3], in which the circular polarization reflection layer includes a cholesteric liquid crystal layer.

[5] The vehicle mirror with an image display function according to [4], in which the circular polarization reflection layer includes three or more cholesteric liquid crystal layers.

[6] The vehicle mirror with an image display function according to [4] or [5], further comprising: a ¼ wavelength plate, in which the half mirror includes the $n\lambda/4$ retardation film, the circular polarization reflection layer, and the ¼ wavelength plate in this order.

[7] The vehicle mirror with an image display function according to [6], in which the circular polarization reflection layer and the ¼ wavelength plate are in direct contact with each other.

[8] The vehicle mirror with an image display function according to any one of [1] to [7], in which the half mirror includes a front surface plate, and the front surface plate, the $n\lambda/4$ retardation film, and the reflection layer are provided in this order.

[9] The vehicle mirror with an image display function according to any one of [1] to [7], in which the half mirror includes a front surface plate, the front surface plate is a laminated glass including two glass plates and an interlayer between the two glass plates, and the interlayer includes the $n\lambda/4$ retardation film.

[10] The vehicle mirror with an image display function according to any one of [1] to [7], in which the half mirror is a laminated glass including two glass plates and an interlayer between the two glass plates, and the interlayer includes the $n\lambda/4$ retardation film and the reflection layer.

According to the present invention, there is provided a vehicle mirror with an image display function in which a bright image can be displayed and a mirror-reflected image having no unevenness can be observed. In a case where the mirror with an image display function according to the present invention is used as an inner mirror of a vehicle, external scenery through a rear glass can be observed as a mirror-reflected image having no unevenness.

DESCRIPTION OF THE PREFERRED EMBODIMENTS

Hereinafter, the present invention will be described in detail.

In the present specification, "to" is used to mean that numerical values before and after "to" are included as a lower limit value and an upper limit value.

In the present specification, an angle such as "45°", "parallel", "vertical", or "perpendicular" means that a difference from an exact angle is in a range less than 5 degrees unless otherwise stated. The difference from an exact angle is preferably less than 4 degrees, and more preferably less than 3 degrees.

In the present specification, "(meth)acrylate" is used to mean "one or both of acrylate and methacrylate".

In the present specification, in a case where "selectively" is used in regard to circularly polarized light, it means that the light quantity of any one of a right circular polarization component and a left circular polarization component is greater than that of the other circular polarization component. Specifically, when "selectively" is used, the circular polarization degree of light is preferably 0.3 or greater, more preferably 0.6 or greater, and even more preferably 0.8 or greater. Substantially, the circular polarization degree is yet even more preferably 1.0.

Here, the circular polarization degree is a value which is expressed by $|I_R - I_L|/(I_R + I_L)$ where the intensity of a right circular polarization component of light is represented by $I_R$, and the intensity of a left circular polarization component is represented by $I_L$.

In the present specification, when "sense" is used in regard to circularly polarized light, it means that the light is either right-circularly polarized light or left-circularly polarized light. The sense of circularly polarized light is defined such that, in a case where light is viewed as it proceeds toward an observer and in a case where the tip of an electric field vector rotates clockwise with the increase in time, the light is right-circularly polarized light, and in a case where it rotates counterclockwise, the light is left-circularly polarized light.

In the present specification, the term "sense" may be used in regard to a twisted direction of the helix of cholesteric liquid crystal. In selective reflection by cholesteric liquid crystal, in a case where a twisted direction (sense) of the helix of the cholesteric liquid crystal is right-handed, the right-circularly polarized light is reflected and the left-circularly polarized light is transmitted. In a case where the sense is left-handed, the left-circularly polarized light is reflected, and the right-circularly polarized light is transmitted.

In electromagnetic rays, visible light rays are light rays in a wavelength region human's eyes can see, and refer to light in a wavelength region of 380 nm to 780 nm. Infrared rays (infrared light) are electromagnetic rays in a wavelength region which is longer than visible light rays and shorter than radio waves. In infrared rays, near-infrared light refers to electromagnetic rays in a wavelength region of 780 nm to 2500 nm.

In the present specification, when "image" is used in regard to a vehicle mirror with an image display function, it means an image which can be observed by being visually recognized from a front surface side when an image display portion of an image display device displays the image. In addition, in the present specification, when "mirror-reflected image" is used in regard to the vehicle mirror with an image display function, it means an image which can be observed by being visually recognized from the front surface side when the image display portion of the image display device displays no image.

In the present specification, the front phase difference is a value measured using AxoScan manufactured by Axometrics, Inc. In the present specification, the front phase difference may be represented by Re. The measurement wavelength of the front phase difference is 550 nm unless otherwise stated. As the front phase difference, a value measured by making light with a wavelength in a visible light wavelength region, such as a central wavelength of selective reflection of a cholesteric liquid crystal layer, incident in a film normal direction in KOBRA 21ADH or WR (manufactured by Oji Scientific Instruments) can also be used. In the selection of the measurement wavelength, a wavelength selective filter can be manually replaced, or the measured value can be converted by a program or the like for measurement.

In the present specification, the vehicle means a train, an automobile, or the like. Particularly, an automobile having a rear glass is preferable as the vehicle.

<<<Vehicle Mirror with Image Display Function>>>

A vehicle mirror with an image display function can be used as a vehicle rearview mirror (inner mirror). The vehicle mirror with an image display function may have a frame, a housing, a support arm for attachment to a vehicle body, and the like so as to be used as a rearview mirror. The vehicle mirror with an image display function may be formed to be mounted on a rearview mirror. In the vehicle mirror with an image display function having the above shape, vertical and horizontal directions in ordinary use can be specified.

The vehicle mirror with an image display function may have a plate shape or a film shape, and have a curved surface. A front surface of the vehicle mirror with an image display function may be flat or curved. In a case where the vehicle mirror is curved and the convex curved surface is on the front surface side, the mirror can be made as a wide mirror enabling visual recognition of a rear visual field in a wide angle. Such a curved front surface can be produced using a curved half mirror.

The curvature may be in a vertical direction, in a horizontal direction, or in vertical and horizontal directions. Regarding the curvature, the radius of curvature is preferably 500 to 3000 mm, and more preferably 1000 to 2500 mm. The radius of curvature is a radius of a circumscribed circle of a curved portion, assumed in cross-section.

The vehicle mirror with an image display function according to the present invention includes an image display device and a half mirror.

In the vehicle mirror with an image display function, an air layer or an adhesive layer may exist between the image display device and the half mirror.

In the present specification, a surface of the image display device on the half mirror side may be referred to as a front surface.

In the present specification, the "vehicle mirror with an image display function" may be simply referred to as the "mirror with an image display function".

<<Image Display Device>>

The image display device is not particularly limited. The image display device is preferably an image display device which forms an image by emitting linearly polarized light, and more preferably a liquid crystal display device or an organic EL device.

The liquid crystal display device may be a transmission type or a reflection type, and is particularly preferably a transmission type. The liquid crystal display device may be a liquid crystal display device of any one of an in plane switching (IPS) mode, a fringe field switching (FFS) mode, a vertical alignment (VA) mode, an electrically controlled birefringence (ECB) mode, a super twisted nematic (STN) mode, a twisted nematic (TN) mode, an optically compensated bend (OCB) mode, and the like.

Regarding the average visible light reflectivity, a reflection spectrum is measured by a spectrophotometer and calculation is performed based on a visible light calculation method described in JIS A5759. As the spectrophotometer, for example, a spectrophotometer "V-670" manufactured by JASCO Corporation can be used.

The image which is displayed on the image display portion of the image display device may be a still image, a motion picture, or simple texture information. The display may be monochrome display such as black and white display, multi-color display, or full-color display. Preferable examples of the image which is displayed on the image display portion of the image display device include an image taken by a car-mounted camera. This image is preferably a motion picture.

In the image display device, for example, an emission peak wavelength λR of red light, an emission peak wavelength λG of green light, and an emission peak wavelength λB of blue light may be shown in an emission spectrum during white display. In a case where the image display device has such emission peak wavelengths, it can display a full-color image. λR may be any wavelength in a range of 580 to 700 nm, and preferably in a range of 610 to 680 nm. λG may be any wavelength in a range of 500 to 580 nm, and preferably in a range of 510 to 550 nm. λB may be any wavelength in a range of 400 to 500 nm, and preferably in a range of 440 to 480 nm.

<<Half Mirror>>

The half mirror may have a plate shape or a film shape, and have a curved surface. The half mirror may be flat or curved. A curved half mirror can be produced using a curved front surface plate.

The half mirror includes a reflection layer and an nλ/4 retardation film. The reflection layer and the nλ/4 retardation film are preferably laminated with the same main surface area. In the present specification, the "main surface" refers to a surface of a plate-shaped or film-shaped member (front surface, rear surface).

The half mirror may include other layers such as a front surface plate or an adhesive layer. In a case where the half mirror includes a front surface plate, the front surface plate, the nλ/4 retardation film, and the reflection layer are preferably provided in this order. In a case where the half mirror includes a front surface plate, the area of the main surface of the front surface plate may be larger than, the same as, or smaller than the area of the main surface of the reflection layer. The reflection layer may be adhered to a part of the main surface of the front surface plate and another type of reflection layer such as metal foil may be adhered to or formed on the other part of the main surface. Due to such a configuration, image display on a part of the mirror is possible. The reflection layer may be adhered to the entire main surface of the front surface plate. In addition, in the mirror with an image display function, a half mirror having a main surface of the same area as the image display portion of the image display device, or a half mirror having a larger or smaller main surface area than the image display portion of the image display device may be used. By selecting from among these relationships, the ratio or position of the surface of the image display portion with respect to the entire surface of the mirror can be adjusted.

Furthermore, the half mirror may be a laminated glass, and an nλ/4 retardation film, or an nλ/4 retardation film and a reflection layer may be included as an interlayer of the laminated glass.

The thickness of the half mirror is not particularly limited, but preferably 100 μm to 20 mm, more preferably 200 μm to 15 mm, and even more preferably 300 μm to 10 mm.

<nλ/4 Retardation Film>

The half mirror includes an nλ/4 retardation film. The nλ/4 retardation film is a λ/4 retardation film or a (mλ±λ/4) retardation film (m is natural number) and functions to substantially shift the phase of reflected light by ±λ/4. n may be 1, 3, 5, or 7 from the viewpoint of easy production and function. That is, the nλ/4 retardation film may be a λ/4 retardation film, a 3λ/4 retardation film, a 5λ/4 retardation film, or a 7λ/4 retardation film. Specifically, the λ/4 retardation film may be a retardation film in which the front phase difference at a wavelength of 550 nm is 138 nm±10 nm, and preferably 138 nm±5 nm, the 3λ/4 retardation film may be a retardation film in which the front phase difference at a wavelength of 550 nm is 413 nm±10 nm, and preferably 413 nm±5 nm, the 5λ/4 retardation film may be a retardation film in which the front phase difference at a wavelength of 550 nm is 688 nm±10 nm, and preferably 688 nm±5 nm, and the 7λ/4 retardation film may be a retardation film in which the front phase difference at a wavelength of 550 nm is 963 nm±10 nm, and preferably 963 nm±5 nm. The nλ/4 retardation film is preferably a λ/4 retardation film, a 3λ/4 retardation film, or a 5λ/4 retardation film, more preferably a λ/4 retardation film or a 3λ/4 retardation film, and most preferably a λ/4 retardation film.

In the present specification, the "nλ/4 retardation film" and a "¼ wavelength plate" to be described later are used distinctively from the viewpoint of position or intended use. However, in a case where the nλ/4 retardation film is a λ/4 retardation film, the "nλ/4 retardation film" and the "¼ wavelength plate" may be the same.

A reinforced glass (for example, reinforced glass that does not have a laminated glass configuration) which is used as a window glass of a vehicle, particularly, a rear glass is known to have birefringent distribution. In general, a reinforced glass is produced by heating a float plate glass to near a softening point, that is, 700° C., and by then rapidly cooling the glass by blowing air toward the glass surface. By this treatment, the temperature of the glass surface is reduced earlier, and contraction and solidification proceeds. The temperature of the internal part of the glass is slowly reduced in comparison with the case of the surface, and the internal part of the glass also slowly contracts. Therefore, stress distribution is generated in the internal part, and thus birefringent distribution is generated in a reinforced glass even in a case where a float plate glass having no birefringent property is used.

Therefore, particularly, a mirror-reflected image obtained by the light that passes through a rear glass or the like of the vehicle formed using the reinforced glass produced as described above and enters the front surface of the mirror with an image display function is thought to have the above-described unevenness. That is, in a case of sunlight, a polarization component is either p-polarized or s-polarized and included according to the positional relationship between sun and an observer. In addition, in light reflected from the water surface or the surface of asphalt or glass, the proportion of s-polarized light is large. Such polarized light exists in nature, and in a case where light including polarized light passes through a rear glass, polarization distribution is generated in transmitted light due to the deviation distribution of birefringence of the rear glass. In a case where the above light is reflected from a linear polarization reflection layer or a circular polarization reflection layer of the vehicle mirror, the reflectivity varies by a difference in the polarization state of incident light, and brightness unevenness is visually recognized. In the mirror with an image display function according to the present invention, it is presumed that the unevenness can be reduced by shifting the phase difference of incident light having a polarization state varying by location to an area where the difference in the intensity of reflected light rarely occurs with the use of the nλ/4 retardation film having a phase difference of a predetermined magnitude.

In the present specification, the p-polarized light means polarized light vibrating in a direction parallel to the light incident face, and the s-polarized light means polarized light vibrating in a direction perpendicular to the light incident face. The incident face means a face which is perpendicular to a reflective face (ground or the like) and includes incident light rays and reflected light rays.

In the mirror with an image display function, the $n\lambda/4$ retardation film may be provided such that the $n\lambda/4$ retardation film, the reflection layer, and the image display device are provided in this order. In a case where the half mirror has a front surface plate, the front surface plate, the $n\lambda/4$ retardation film, the reflection layer, and the image display device may be provided in this order. The front surface plate may also serve as the $n\lambda/4$ retardation film.

As the $n\lambda/4$ retardation film, a film which is the same as a ¼ wavelength plate to be described later can be used, and a $3/4\lambda$ retardation film, a $5/4\lambda$ retardation film, or a $7/4\lambda$ retardation film can be formed and used by using a similar material and adjusting a thickness. As the $n\lambda/4$ retardation film, a film formed by arranging and fixing a polymerizable liquid crystal compound or a polymer liquid crystal compound is particularly preferable.

The above-described unevenness in the mirror-reflected image can also be eliminated by providing the $n\lambda/4$ retardation film in the rear glass of a vehicle. In this case, the mirror with an image display function may not include the $n\lambda/4$ retardation film.

<Reflection Layer>

As the reflection layer, a reflection layer which can function as a semi-transmissive semi-reflective layer may be used. That is, the reflection layer may function to transmit light emitted from the image display device during image display, such that an image is displayed on the front surface of the mirror with an image display function, and during no image display, the reflection layer may function to reflect at least a part of incident light in a front surface direction and transmit light reflected from the image display device, such that the front surface of the mirror with an image display function serves as a mirror.

A polarization reflection layer is used as the reflection layer. The polarization reflection layer may be a linear polarization reflection layer or a circular polarization reflection layer.

[Linear Polarization Reflection Layer]

Examples of the linear polarization reflection layer include (i) a linear polarization reflection plate having a multi-layer structure, (ii) a polarizer including a laminate of thin films having different types of birefringence, (iii) a wire grid polarizer, (iv) a polarizing prism, and (v) a scattering anisotropic polarizing plate.

Examples of (i) the linear polarization reflection plate having a multi-layer structure include a laminated thin film in which a plurality of dielectric materials having different refractive indices are laminated on a support in an oblique direction by a vacuum deposition method or a sputtering method. In order to form a wavelength-selective reflection film, it is preferable that a dielectric thin film having a high refractive index and a dielectric thin film having a low refractive index are alternately laminated in a plurality of layers. However, the number of film types is not limited to two, and three or more types of films may be used. The number of layers to be laminated is preferably 2 to 20, more preferably 2 to 12, even more preferably 4 to 10, and particularly preferably 6 to 8. In a case where the number of layers to be laminated is greater than 20, production efficiency may decrease, and the object and effect of the present invention may not be achieved.

The method of forming the dielectric thin film is not particularly limited, and can be appropriately selected in accordance with the purpose. Examples thereof include physical vapor deposition methods (PVD methods) such as ion plating, vacuum vapor deposition using ion beams, and sputtering, and chemical vapor deposition methods (CVD methods). Among these, a vacuum vapor deposition method and a sputtering method are preferable, and a sputtering method is particularly preferable.

As (ii) the polarizer including a laminate of thin films having different types of birefringence, for example, a polarizer described in JP1997-506837A (JP-H9-506837A) or the like can be used. Specifically, in a case where processing is performed under conditions selected to obtain a refractive index relationship, it is possible to form a polarizer by using a wide variety of materials. In general, one first material needs to have a refractive index different from that of a second material in a selected direction. The difference in the refractive index can be achieved by various methods including stretching during or after film formation, extrusion molding, or coating. Moreover, in order to coextrude two materials, the materials preferably have similar rheological characteristics (for example, melt viscosity).

As the polarizer including a laminate of thin films having different types of birefringence, commercially available products can be used, and examples thereof include DBEF (registered trade name) (manufactured by 3M Company).

(iii) The wire grid polarizer is a polarizer which transmits one component of polarized light and reflects the other component thereof by birefringence of fine metal wires.

The wire grid polarizer is obtained by periodically arranging metal wires, and is used as a polarizer mainly in a terahertz wavelength band. In order to allow the wire grids to function as a polarizer, it is necessary for the interval between wires to be sufficiently smaller than the wavelength of the incident electromagnetic waves.

In the wire grid polarizer, metal wires are arranged at the same intervals. A polarization component in a polarization direction parallel to a longitudinal direction of the metal wires is reflected from the wire grid polarizer, and a polarization component in a polarization direction perpendicular thereto is transmitted through the wire grid polarizer.

As the wire grid polarizer, commercially available products can be used, and examples thereof include a wire grid polarizing filter 50×50, NT46-636, manufactured by Edmund Optics GmbH Germany.

In a case where the linear polarization reflection layer is used and combined with the $n\lambda/4$ retardation film, incident light from the front surface side can be reflected as circularly polarized light, and incident light from the image display device can be transmitted as circularly polarized light. Therefore, in the mirror with an image display function using the linear polarization reflection layer, it is possible to perform image display and observation of a mirror-reflected image without depending on the direction of the mirror with an image display function even via polarized sunglasses.

[Circular Polarization Reflection Layer]

As the circular polarization reflection layer, a circular polarization reflection layer including a cholesteric liquid crystal layer (hereinafter, may be referred to as "cholesteric circular polarization reflection layer") is preferably used.

(Cholesteric Liquid Crystal Layer)

The cholesteric circular polarization reflection layer includes at least one cholesteric liquid crystal layer. The cholesteric liquid crystal layer included in the cholesteric circular polarization reflection layer may exhibit selective reflection in a visible light region.

The circular polarization reflection layer may include two or more cholesteric liquid crystal layers, and may further include other layers such as an alignment layer. The circular polarization reflection layer preferably consists only of a cholesteric liquid crystal layer. In a case where the circular polarization reflection layer includes a plurality of cholesteric liquid crystal layers, these are preferably in direct contact with an adjacent cholesteric liquid crystal layer. The circular polarization reflection layer preferably includes three or more cholesteric liquid crystal layers.

The thickness of the cholesteric circular polarization reflection layer is preferably in a range of 2.0 μm to 300 μm, and more preferably in a range of 8.0 to 200 μm.

In the present specification, the "cholesteric liquid crystal layer" means a layer in which a cholesteric liquid crystalline phase is fixed. The cholesteric liquid crystal layer may be simply referred to as a liquid crystal layer.

The cholesteric liquid crystalline phase has been known to exhibit circularly polarized light selective reflection in which circularly polarized light of any one sense of either right-circularly polarized light or left-circularly polarized light is selectively reflected and circularly polarized light of the other sense is selectively transmitted in a specific wavelength region. In the present specification, the circularly polarized light selective reflection may be simply referred to as selective reflection.

As a film including a layer in which a cholesteric liquid crystalline phase exhibiting circularly polarized light selective reflectivity is fixed, many films formed from a composition containing a polymerizable liquid crystal compound have been known, and regarding the cholesteric liquid crystal layer, the related arts can be referred to.

The cholesteric liquid crystal layer may be a layer in which alignment of a liquid crystal compound in a cholesteric liquid crystalline phase is held. Typically, the cholesteric liquid crystal layer may be a layer obtained in such a manner that a polymerizable liquid crystal compound is allowed to be in an alignment state of a cholesteric liquid crystalline phase, and polymerized and cured by ultraviolet irradiation, heating, or the like to form a layer having no fluidity, and at the same time, the layer is changed such that the form of alignment is not changed by an external field or an external force. In the cholesteric liquid crystal layer, the optical properties of the cholesteric liquid crystalline phase just need to be held in the layer, and the liquid crystal compound in the layer may not exhibit liquid crystallinity. For example, the molecular weight of the polymerizable liquid crystal compound may be increased by a curing reaction, and the liquid crystallinity may be lost.

A central wavelength λ of selective reflection of the cholesteric liquid crystal layer depends on a pitch P (periodicity of helix) of a helical structure in a cholesteric liquid crystalline phase, and has a relationship of λ=n×P with an average refractive index n of the cholesteric liquid crystal layer. The central wavelength of selective reflection of the cholesteric liquid crystal layer and the half-width can be calculated as follows.

A reducing peak of the transmittance is shown in a selective reflection region in a case where the transmission spectrum of a light reflecting layer (measured in a normal direction of a cholesteric liquid crystal layer) is measured using a spectrophotometer UV3150 (Shimadzu Corporation). In two wavelengths corresponding to transmittances at half of the highest peak height, in a case where the value of the short-wave side wavelength is represented by λ1 (nm) and the value of the long-wave side wavelength is represented by λ2 (nm), the central wavelength of selective reflection and the half-width can be expressed by the following formulae.

Central Wavelength of Selective Reflection=(λ1+λ2)/2 Half-Width=(λ2−λ1)

The central wavelength λ of selective reflection of the cholesteric liquid crystal layer, calculated as described above, generally coincides with a wavelength at a centroid position of a reflection peak of a circular polarization reflection spectrum measured in the normal direction of the cholesteric liquid crystal layer. In the present specification, the central wavelength of selective reflection means a central wavelength when measured in the normal direction of the cholesteric liquid crystal layer.

As is obvious from the above formula λ=n×P, the central wavelength of selective reflection can be adjusted by adjusting the pitch of the helical structure. By adjusting the n value and the P value, any one of right-circularly polarized light and left-circularly polarized light is selectively reflected with respect to light with a desired wavelength, and thus the central wavelength λ can be adjusted.

In a case where light is obliquely incident on the cholesteric liquid crystal layer, the central wavelength of selective reflection shifts to the short wavelength side. Therefore, with respect to the wavelength of selective reflection necessary for image display, n×P is preferably adjusted such that λ calculated in accordance with the above formula λ=n×P becomes a long wavelength. In a case where the central wavelength of selective reflection when light rays pass through a cholesteric liquid crystal layer with a refractive index $n_2$ in a normal direction of the cholesteric liquid crystal layer (a helical axis direction of the cholesteric liquid crystal layer) at an angle of $\theta_2$ is represented by $\lambda_d$, $\lambda_d$ is expressed by the following formula.

$$\lambda_d = n_2 \times P \times \cos \theta_2$$

In a case where the central wavelength of selective reflection of the cholesteric liquid crystal layer included in the circular polarization reflection layer is designed in consideration of the above description, the reduction in image visibility in an oblique direction can be prevented. In addition, the image visibility in an oblique direction can be intentionally reduced. This is useful since peeping can be prevented in, for example, smartphones and personal computers. In addition, in the mirror with an image display function according to the present invention, resulting from the above-described selective reflection property, a tint may appear on images and mirror-reflected images viewed in an oblique direction. The tint can be prevented from appearing in a case where the circular polarization reflection layer includes a cholesteric liquid crystal layer having a central wavelength of selective reflection in an infrared light region. In this case, the central wavelength of selective reflection of the infrared light region may be specifically 780 to 900 nm, and preferably 780 to 850 nm.

In a case where a cholesteric liquid crystal layer having a central wavelength of selective reflection in an infrared light region is provided, all cholesteric liquid crystal layers having a central wavelength of selective reflection in a visible light region are preferably closest to the image display device side.

Since the pitch of the cholesteric liquid crystalline phase depends on the type or the concentration of a chiral agent which is used together with the polymerizable liquid crystal compound, a desired pitch can be obtained by adjusting the type or the concentration. Furthermore, methods described in "Introduction to Liquid Crystal Chemical Test", p. 46, edited by Japan Liquid Crystal Society, published by Sigma Publications, 2007, and "Liquid Crystal Handbook", p. 196, Liquid Crystal Handbook Editing Committee Maruzen can be used as a method of measuring the sense or the pitch of the helix.

In the mirror with an image display function according to the present invention, the circular polarization reflection layer preferably includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region. The reflection layer preferably includes, for example, a cholesteric liquid crystal layer having a central wavelength of selective reflection in 400 nm to 500 nm, a cholesteric liquid crystal layer having a central wavelength of selective reflection in 500 nm to 580 nm, and a cholesteric liquid crystal layer having a central wavelength of selective reflection in 580 nm to 700 nm.

In a case where the circular polarization reflection layer includes a plurality of cholesteric liquid crystal layers, a cholesteric liquid crystal layer closer to the image display device preferably has a longer central wavelength of selective reflection. Due to such a configuration, a tint appearing in an oblique direction on an image can be suppressed.

Particularly, in a mirror with an image display function which uses a cholesteric circular polarization reflection layer including no ¼ wavelength plate, the central wavelength of selective reflection of each cholesteric liquid crystal layer is preferably different from the emission peak wavelength of the image display device by 5 nm or greater. This difference is more preferably 10 nm or greater. By shifting the central wavelength of selective reflection and the emission peak wavelength for image display of the image display device from each other, a display image can be made bright without reflection of light for image display by the cholesteric liquid crystal layer. The emission peak wavelength of the image display device can be confirmed in an emission spectrum during white display of the image display device. The peak wavelength may be a peak wavelength in a visible light region of the emission spectrum, and may be, for example, one or more selected from the group consisting of the emission peak wavelength $\lambda R$ of red light, the emission peak wavelength $\lambda G$ of green light, and the emission peak wavelength $\lambda B$ of blue light of the image display device which have been described above. The central wavelength of selective reflection of the cholesteric liquid crystal layer is preferably different from any of the emission peak wavelength $\lambda R$ of red light, the emission peak wavelength $\lambda G$ of green light, and the emission peak wavelength $\lambda B$ of blue light of the image display device which have been described above by 5 nm or greater, and more preferably by 10 nm or greater. In a case where the circular polarization reflection layer includes a plurality of cholesteric liquid crystal layers, the central wavelength of selective reflection of all of the cholesteric liquid crystal layers may be different from the peak wavelength of the light emitted from the image display device by 5 nm or greater, and preferably by 10 nm or greater. For example, in a case where the image display device is a full-color display device in which an emission peak wavelength $\lambda R$ of red light, an emission peak wavelength $\lambda G$ of green light, and an emission peak wavelength $\lambda B$ of blue light are shown in an emission spectrum during white display, the central wavelength of selective reflection of all of the cholesteric liquid crystal layers may be different from any of $\lambda R$, $\lambda G$, and $\lambda B$ by 5 nm or greater, and preferably by 10 nm or greater.

In a case where the central wavelength of selective reflection of the cholesteric liquid crystal layer to be used is adjusted in accordance with the light emitting wavelength region of the image display device and the use mode of the circular polarization reflection layer, a bright image can be displayed with high light utilization efficiency. Examples of the use mode of the circular polarization reflection layer include an incidence angle of light on the circular polarization reflection layer and an image observation direction.

As each cholesteric liquid crystal layer, a cholesteric liquid crystal layer in which the sense of the helix is right-handed or left-handed is used. The sense of the reflected circularly polarized light of the cholesteric liquid crystal layer is identical to the sense of the helix. In a case where a plurality of cholesteric liquid crystal layers are included, the senses of the helices thereof may be the same as or different from each other. That is, cholesteric liquid crystal layers in which the helical sense is either right-handed or left-handed may be included, or cholesteric liquid crystal layers in which the helical sense is right-handed and cholesteric liquid crystal layers in which the helical sense is left-handed may be included. However, in a mirror with an image display function including a ¼ wavelength plate, a plurality of cholesteric liquid crystal layers preferably have the same sense of the helix. In that case, as for each cholesteric liquid crystal layer, the sense of the helix may be determined in accordance with the sense of circularly polarized light of a sense obtained by emission from the image display device and transmission through the ¼ wavelength plate. Specifically, a cholesteric liquid crystal layer having a sense of a helix which transmits circularly polarized light of a sense obtained by emission from the image display device and transmission through the ¼ wavelength plate may be used.

A half-width $\Delta\lambda$, (nm) of a selective reflection band in which selective reflection is exhibited depends on the birefringence $\Delta n$ of the liquid crystal compound and the pitch P, and has a relationship of $\Delta\lambda = \Delta n \times P$ therewith. Therefore, the width of the selective reflection band can be controlled by adjusting $\Delta n$. $\Delta n$ can be adjusted by adjusting the type or the mixing ratio of the polymerizable liquid crystal compound or controlling the temperature at the time of alignment fixing.

In order to form one type of cholesteric liquid crystal layers having the same central wavelength of selective reflection, a plurality of cholesteric liquid crystal layers having the same pitch P and the same sense of the helix may be laminated. By laminating cholesteric liquid crystal layers having the same pitch P and the same sense of the helix, circular polarization selectivity can be increased at a specific wavelength.

(¼ Wavelength Plate)

The mirror with an image display function using the cholesteric circular polarization reflection layer may further include a ¼ wavelength plate.

In a case where a ¼ wavelength plate is included between the image display device and the cholesteric circular polarization reflection layer, particularly, the light from the image display device which displays an image with linearly polarized light can be converted into circularly polarized light and allowed to incident on the cholesteric circular polarization reflection layer. Therefore, the light reflected by the circular polarization reflection layer and returning to the image display device side can be significantly reduced, and a bright image can be displayed. In addition, with the use of the ¼ wavelength plate, a configuration can be made in which circularly polarized light of a sense that is reflected to the image display device side is not generated in the cholesteric circular polarization reflection layer, and thus a reduction in the image display quality caused by multiple reflections between the image display device and the half mirror hardly occurs.

That is, for example, even in a case where the central wavelength of selective reflection of the cholesteric liquid crystal layer included in the cholesteric circular polarization reflection layer is substantially the same as the emission peak wavelength of blue light in an emission spectrum during white display of the image display device (the difference therebetween is, for example, less than 5 nm), the light emitted from the image display device can be transmitted to the front surface side without generation of circularly polarized light of a sense that is reflected to the image display side in the circular polarization reflection layer.

In a case where the ¼ wavelength plate which is used in combination with the cholesteric circular polarization reflection layer is adhered to the image display device, the angle of the ¼ wavelength plate is preferably adjusted such that the image is made brightest. That is, particularly, in order to allow linearly polarized light to be most satisfactorily transmitted through the image display device which displays an image with linearly polarized light, the relationship between a polarization direction (transmission axis) of the linearly polarized light and a slow axis of the ¼ wavelength plate is preferably adjusted. For example, in a case of a single layer-type ¼ wavelength plate, the transmission axis and the slow axis preferably form an angle of 45°. The light emitted from the image display device which displays an image with linearly polarized light is transmitted through the ¼ wavelength plate, and then becomes circularly polarized light of any one of right sense and left sense. The circular polarization reflection layer may be composed of a cholesteric liquid crystal layer having a twisted direction in which the circularly polarized light of the above-described sense is transmitted.

The ¼ wavelength plate may be a retardation layer which functions as a ¼ wavelength plate in a visible light region. Examples of the ¼ wavelength plate include a single layer-type ¼ wavelength plate and a broadband ¼ wavelength plate in which a ¼ wavelength plate and a ½ wavelength retardation plate are laminated.

The front phase difference of the former ¼ wavelength plate may be ¼ of the light emission wavelength of the image display device. Therefore, as the ¼ wavelength plate, a retardation layer which exhibits inverse dispersibility such that for example, in a case where the light emission wavelength of the image display device is 450 nm, 530 nm, or 640 nm, the front phase difference is 112.5 nm±10 nm, preferably 112.5 nm±5 nm, and more preferably 112.5 nm with a wavelength of 450 nm, the front phase difference is 132.5 nm±10 nm, preferably 132.5 nm±5 nm, and more preferably 132.5 nm with a wavelength of 530 nm, and the front phase difference is 160 nm±10 nm, preferably 160 nm±5 nm, and more preferably 160 nm with a wavelength of 640 nm is most preferable. However, a retardation plate which exhibits small wavelength dispersibility of phase difference or a retardation plate which exhibits forward dispersibility can also be used. The inverse dispersibility means a property that as the longer the wavelength, the larger the absolute value of the phase difference. The forward dispersibility means a property that as the shorter the wavelength, the larger the absolute value of the phase difference.

In the lamination-type ¼ wavelength plate, the ¼ wavelength plate and the ½ wavelength retardation plate are bonded such that an angle of a slow axis thereof is 60°, and thus the ½ wavelength retardation plate side is disposed on the side on which linearly polarized light is incident, and the slow axis of the ½ wavelength retardation plate intersects with the polarization surface of the incident linearly polarized light by 15° or 75°. Since the lamination-type ¼ wavelength plate exhibits good inverse dispersibility of phase difference, it can be suitably used.

The ¼ wavelength plate is not particularly limited, and can be appropriately selected in accordance with the purpose. Examples thereof include a quartz plate, a stretched polycarbonate film, a stretched norbornene-based polymer film, a transparent film containing aligned inorganic particles having birefringence such as strontium carbonate, and a thin film in which an inorganic dielectric material is obliquely vapor-deposited on a support.

Examples of the ¼ wavelength plate include (1) a retardation plate described in JP1993-27118A (JP-H5-27118A) and JP1993-27119A (JP-H5-27119A) in which a birefringent film having large retardation and a birefringent film having small retardation are laminated such that optical axes thereof are perpendicular to each other, (2) a retardation plate described in JP1998-68816A (JP-H10-68816A) in which a polymer film having a ¼ wavelength at a specific wavelength and a polymer film made of the same material as the former polymer film and having a ½ wavelength at the same wavelength are laminated to obtain a ¼ wavelength in a wide wavelength range, (3) a retardation plate described in JP1998-90521A (JP-H10-90521A), capable of achieving a ¼ wavelength in a wide wavelength range by laminating two polymer films, (4) a retardation film capable of achieving a ¼ wavelength in a wide wavelength range by using a modified polycarbonate film described in WO00/26705A, and (5) a retardation plate capable of achieving a ¼ wavelength in a wide wavelength range by using a cellulose acetate film described in WO00/65384A.

A commercially available product can also be used as the ¼ wavelength plate. Examples of the commercially available product include PURE-ACE (registered trade name) WR (polycarbonate film manufactured by TEIJIN LIMITED).

The ¼ wavelength plate may be formed by arranging and fixing a polymerizable liquid crystal compound or a polymer liquid crystal compound. For example, the ¼ wavelength plate can be formed by coating a temporary support, an alignment film, or a surface of the front surface plate with a liquid crystal composition, forming the polymerizable liquid crystal compound in the liquid crystal composition in a nematic alignment in a liquid crystal state, and then fixing the alignment by photo-crosslinking or thermal crosslinking. Details of the liquid crystal composition or the producing method thereof will be described later. The ¼ wavelength plate may be a layer which is obtained by coating a temporary support, an alignment film, or a surface of the front surface plate with a liquid crystal composition containing a polymer liquid crystal compound, forming the compound in a nematic alignment in a liquid crystal state, and then fixing the alignment by cooling.

The ¼ wavelength plate and the cholesteric circular polarization reflection layer may be adhered with an adhesive layer or in direct contact with each other, and are preferably in direct contact with each other.

(Method of Producing Cholesteric Liquid Crystal Layer and ¼ Wavelength Plate and nλ/4 Retardation Film Formed from Liquid Crystal Composition)

Hereinafter, materials and methods for producing the cholesteric liquid crystal layer and the nλ/4 retardation film and the ¼ wavelength plate formed from a liquid crystal composition will be described.

Examples of the material used to form the ¼ wavelength plate and the nλ/4 retardation film include a liquid crystal composition containing a polymerizable liquid crystal compound. Examples of the material used to form the cholesteric liquid crystal layer include a liquid crystal composition containing a chiral agent (optically active compound). The liquid crystal composition which is further mixed with a surfactant, a polymerization initiator, or the like if necessary and dissolved in a solvent or the like is coated on a temporary support, a support, an alignment film, an nλ/4 retardation film, a cholesteric liquid crystal layer serving as an underlayer, a ¼ wavelength plate, or the like, and after alignment and maturing, the liquid crystal composition is cured for fixing to form the cholesteric liquid crystal layer or the ¼ wavelength plate.

—Polymerizable Liquid Crystal Compound—

A rod-like liquid crystal compound may be used as the polymerizable liquid crystal compound.

Examples of the rod-like polymerizable liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used. It is possible to use not only a low-molecular liquid crystal compound, but also a polymer liquid crystal compound.

The polymerizable liquid crystal compound is obtained by introducing a polymerizable group in a liquid crystal compound. Examples of the polymerizable group include an unsaturated polymerizable group, an epoxy group, and an aziridinyl group. An unsaturated polymerizable group is preferable, and an ethylenically unsaturated polymerizable group is particularly preferable. The polymerizable group can be introduced in molecules of a liquid crystal compound by various methods. The number of the polymerizable groups in the polymerizable liquid crystal compound is preferably 1 to 6, and more preferably 1 to 3. Examples of the polymerizable liquid crystal compound include those described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more types of polymerizable liquid crystal compounds may be used in combination. Using two or more types of polymerizable liquid crystal compounds in combination may contribute to lowering the alignment temperature.

The amount of the polymerizable liquid crystal compound added in the liquid crystal composition is preferably 80 to 99.9 mass %, more preferably 85 to 99.5 mass %, and particularly preferably 90 to 99 mass % with respect to the solid content mass of the liquid crystal composition (mass excluding the mass of the solvent).

—Chiral Agent: Optically Active Compound—

The material used to form the cholesteric liquid crystal layer preferably contains a chiral agent. The chiral agent functions to induce the helical structure of the cholesteric liquid crystalline phase. The chiral compound may be selected in accordance with the purpose since compounds are different in the helix pitch or the sense of the helix to be induced.

The chiral agent is not particularly limited, and a known compound (for example, described in Liquid Crystal Device Handbook, Third Chapter, Section 4-3, Chiral Agent for TN or STN, p. 199, edited by No. 142 Committee of Japan Society for the Promotion of Science, in 1989), isosorbide, or an isomannide derivative can be used.

In general, the chiral agent contains asymmetric carbon atoms. However, an axial asymmetric compound or a planar asymmetric compound containing no asymmetric carbon atoms can also be used as a chiral agent. Examples of the axial asymmetric compound or the planar asymmetric compound include binaphthyl, helicene, paracyclophane, and their derivatives. The chiral agent may have a polymerizable group. In a case where all of the chiral agent and the liquid crystal compound have a polymerizable group, the polymerization reaction of the polymerizable chiral agent and the polymerizable liquid crystal compound can give a polymer having a repeating unit derived from the polymerizable liquid crystal compound and a repeating unit derived from the chiral compound. In this embodiment, the polymerizable group of the polymerizable chiral agent is preferably the same type as the polymerizable group of the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

The chiral agent may be a liquid crystal compound.

The content of the chiral agent in the liquid crystal composition is preferably 0.01 mol % to 200 mol %, and more preferably 1 mol % to 30 mol % with respect to the amount of the polymerizable liquid crystal compound.

—Polymerization Initiator—

The liquid crystal composition preferably contains a polymerization initiator. In an embodiment in which a polymerization reaction is carried out by ultraviolet irradiation, a polymerization initiator to be used is preferably a photopolymerization initiator capable of initiating a polymerization reaction by ultraviolet irradiation. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combination of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), acylphosphine oxide compounds (described in JP1988-40799B (JP-S63-40799B), JP1993-29234B (JP-H5-29234B), JP1998-95788A (JP-H10-95788A), and JP1998-29997A (JP-H10-29997A)), oxime compounds (described in JP2000-66385A and JP4454067B), and oxadiazole compounds (described in U.S. Pat. No. 4,212,970A).

The content of the photopolymerization initiator in the liquid crystal composition is preferably 0.1 to 20 mass %, and more preferably 0.5 mass % to 5 mass % with respect to the content of the polymerizable liquid crystal compound.

—Crosslinking Agent—

The liquid crystal composition may contain an arbitrary crosslinking agent in order to improve the film hardness after curing and durability. As the crosslinking agent, a material which is curable with ultraviolet rays, heat, moisture, or the like can be suitably used.

The crosslinking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl) 3-aminopropyltrimethoxysilane. A known catalyst can be used depending on the reactivity of the crosslinking agent in order to enhance productivity in addition to the enhancement of the film hardness and the durability. These may be used alone or in combination of two or more types thereof.

The content of the crosslinking agent is preferably 3 mass % to 20 mass %, and more preferably 5 mass % to 15 mass %. In a case where the content of the crosslinking agent is 3 mass % or greater, the crosslinking density improving effect can be obtained. In addition, in a case where the content of the crosslinking agent is 20 mass % or less, the stability of a layer to be formed can be maintained.

—Alignment Control Agent—

In the liquid crystal composition, an alignment control agent may be added to contribute to stable or rapid planar alignment. Examples of the alignment control agent include fluorine (meth)acrylate-based polymers described in paragraphs [0018] to [0043] in JP2007-272185A and compounds represented by Formulae (I) to (IV) described in paragraphs [0031] to [0034] in JP2012-203237A.

The alignment control agents may be used alone or in combination of two or more types thereof.

The amount of the alignment control agent added in the liquid crystal composition is preferably 0.01 mass % to 10 mass %, more preferably 0.01 mass % to 5 mass %, and particularly preferably 0.02 mass % to 1 mass % with respect to the total mass of the polymerizable liquid crystal compound.

—Other Additives—

The liquid crystal composition may contain at least one selected from various additives such as a surfactant for uniformizing the film thickness by adjusting the surface tension of the coating film and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

—Solvent—

The solvent used to prepare the liquid crystal composition is not particularly limited, and can be appropriately selected in accordance with the purpose. An organic solvent is preferably used.

The organic solvent is not particularly limited, and can be appropriately selected in accordance with the purpose. Examples thereof include ketones, alkyl halides, amides, sulfoxides, heterocyclic compounds, hydrocarbons, esters, and ethers. These may be used alone or in combination of two or more types thereof. Among these, ketones are particularly preferable in consideration of the load imposed on the environment.

—Coating, Alignment, and Polymerization—

The method of coating a temporary support, an alignment film, an nλ/4 retardation film, a ¼ wavelength plate, a cholesteric liquid crystal layer serving as an underlayer, or the like with a liquid crystal composition is not particularly limited, and can be appropriately selected in accordance with the purpose. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. Furthermore, the coating can also be performed by transferring a liquid crystal composition, which has been separately applied onto a support. By heating the liquid crystal composition applied, the liquid crystal molecules are aligned. In the formation of the cholesteric liquid crystal layer, the liquid crystal molecules are preferably aligned in a cholesteric manner, and in the formation of the nλ/4 retardation film or the ¼ wavelength plate, the liquid crystal molecules are preferably aligned in a nematic manner. In the cholesteric alignment, the heating temperature is preferably equal to or lower than 200° C., and more preferably equal to or lower than 130° C. By this alignment, an optical thin film is obtained in which the polymerizable liquid crystal compound is aligned in a twisted manner to have a helical axis in a direction substantially perpendicular to the surface of the film. In the nematic alignment, the heating temperature is preferably 50° C. to 120° C., and more preferably 60° C. to 100° C.

The aligned liquid crystal compound can be further subjected to polymerization so as to cure the liquid crystal composition. The polymerization may be any one of thermal polymerization and photopolymerization using light irradiation, but is preferably photopolymerization. Ultraviolet rays are preferably used for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, the rate of the polymerization reaction is preferably high. The rate of the polymerization reaction is preferably equal to or higher than 70%, and more preferably equal to or higher than 80%. The rate of the polymerization reaction can be determined by measuring the consumption rate of polymerizable functional groups by using an IR absorption spectrum.

The thickness of each cholesteric liquid crystal layer is not particularly limited as long as it is in such a range that the above-described characteristics are exhibited. The thickness is preferably in a range of 1.0 μm to 150 μm, and more preferably in a range of 2.5 μm to 100 μm. In addition, the thickness of the ¼ wavelength plate formed from the liquid crystal composition is not particularly limited, but may be preferably 0.2 to 10 μm, and more preferably 0.5 to 2 μm.

—Temporary Support, Support, and Alignment Layer—

The liquid crystal composition may be coated on a surface of a temporary support or an alignment layer formed on the surface of the temporary support to form a layer. The temporary support, or the temporary support and the alignment layer may be peeled off after the formation of the layer.

Particularly, when the nλ/4 retardation film is formed, a support may be used. The support may not be peeled off after the formation of the layer. Examples of the temporary support and the support include polyester such as polyethylene terephthalate (PET), polycarbonate, an acrylic resin, an epoxy resin, polyurethane, polyamide, polyolefin, a cellulose derivative, silicone, and a glass plate. The temporary support may be peeled off after, for example, the adhesion of the circular polarization reflection layer to the nλ/4 retardation film or the support. The temporary support may function as a protective film until the circular polarization reflection layer is adhered to the image display device after the adhesion of the circular polarization reflection layer to the nλ/4 retardation film or the support.

The alignment layer can be provided by means of rubbing of an organic compound (resin such as polyimide, polyvinyl alcohol, polyester, polyarylate, polyamideimide, polyether imide, polyamide, and modified polyamide) such as a polymer, oblique vapor deposition of an inorganic compound, formation of a layer having microgrooves, or accumulation of an organic compound (for example, ω-tricosanoic acid, dioctadecylmethylammonium chloride, or methyl stearate) using a Langmuir-Blodgett method (LB film). Furthermore, an alignment layer may be used which obtains an orientation function by the application of an electric field or a magnetic field or by being irradiated with light.

Particularly, it is preferable that an alignment layer composed of a polymer is rubbed, and then the rubbed surface is coated with the liquid crystal composition. The rubbing can be performed by rubbing the surface of the polymer layer with paper or cloth in a certain direction.

The liquid crystal composition may be coated on a surface of a temporary support or a rubbed surface of a temporary support without providing the alignment layer.

The thickness of the alignment layer is preferably 0.01 to 5 µm, and more preferably 0.05 to 2 µm.

—Lamination Film of Layers Formed from Polymerizable Liquid Crystal Compound—

In the formation of a lamination film consisting of a plurality of cholesteric liquid crystal layers and a lamination film consisting of a ¼ wavelength plate and a plurality of cholesteric liquid crystal layers, a step of directly coating a surface of a ¼ wavelength plate or a front cholesteric liquid crystal layer with a liquid crystal composition containing a polymerizable liquid crystal compound and the like, an alignment step, and a fixing step may be repeated in each case. Otherwise, a ¼ wavelength plate, a cholesteric liquid crystal layer, or a laminate thereof prepared separately may be laminated using an adhesive or the like. However, the former is preferable. The reason for this is that, in general, in a case where an adhesive layer provided to have a film thickness of 0.5 to 10 µm is used, interference unevenness resulting from thickness unevenness of the adhesive layer may be observed, and thus it is preferable that the lamination is performed without using the adhesive layer. In addition, the reason for this is that in a lamination film of cholesteric liquid crystal layers, in a case where a cholesteric liquid crystal layer is formed so as to be in direct contact with a surface of a cholesteric liquid crystal layer formed previously, an alignment direction of liquid crystal molecules on the air interface side of the cholesteric liquid crystal layer formed previously is identical to an alignment direction of liquid crystal molecules on the lower side of the cholesteric liquid crystal layer formed thereon, and the polarization characteristics of the laminate of the cholesteric liquid crystal layers are enhanced.

In addition, the nλ/4 retardation film may form a lamination film with the reflection layer. In the formation, a step of directly coating a surface of an nλ/4 retardation film with a liquid crystal composition containing a polymerizable liquid crystal compound and the like, an alignment step, and a fixing step may be repeated. Otherwise, an nλ/4 retardation film and a reflection layer prepared separately may be laminated using an adhesive or the like.

<Front Surface Plate>

The mirror with an image display function according to the present invention may have a front surface plate.

The front surface plate may be flat or curved.

The front surface plate may be in direct contact with the nλ/4 retardation film, or may be in direct contact therewith using an adhesive layer or the like. The front surface plate is preferably in direct contact therewith using an adhesive layer or the like.

The front surface plate is not particularly limited. A glass plate or a plastic film used to produce a usual mirror can be used as the front surface plate. The front surface plate is preferably transparent in a visible light region. Here, transparent in a visible light region means that the light transmittance in the visible light region is 80% or greater, and preferably 85% or greater. The light transmittance which is used as a measure of transparency is a light transmittance calculated through a method described in JIS-K7105. The light transmittance is a light transmittance calculated through a method described in JIS A5759. That is, a transmittance is measured at wavelengths of 380 nm to 780 nm using a spectrophotometer, and multiplied by a weight value coefficient obtained from a spectral distribution of CIE daylight D65 and a wavelength distribution and a wavelength interval of CIE spectral luminous efficiency for photopic vision to calculate a weighted average, and thus the visible light transmittance is calculated.

In addition, the front surface plate preferably has small birefringence. For example, the front phase difference may be 20 nm or less, preferably less than 10 nm, and more preferably 5 nm or less. Examples of the plastic film include polyester such as polyethylene terephthalate (PET), polycarbonate, an acrylic resin, an epoxy resin, polyurethane, polyamide, polyolefin, a cellulose derivative, and silicone.

A curved front surface plate can be produced by a plastic processing method such as injection molding. In injection molding, for example, raw material plastic pellets are melted by heat, injected into a mold, and solidified by cooling, and thus a resin product can be obtained.

The thickness of the front surface plate may be approximately 100 µm to 10 mm, preferably 200 µm to 5 mm, more preferably 500 µm to 2 mm, and even more preferably 500 µm to 1000 µm.

The front surface plate may also serve as an nλ/4 retardation film. That is, the front surface plate may be an nλ/4 retardation film. Specifically, the front surface plate may be a plastic plate or the like having a phase difference of nλ/4, or a laminated glass including an nλ/4 retardation film as an interlayer.

(Laminated Glass Including nλ/4 Retardation Film as Interlayer)

A laminated glass includes two glass plates and an interlayer therebetween. In general, a laminated glass can be manufactured by a method including: interposing an intermediate film sheet for a laminated glass between two glass plates; repeating a heating treatment and a pressurizing treatment (treatment using a rubber roller or the like) several times; and finally performing a heating treatment in a pressurized state using an autoclave or the like. The thickness of the glass plate is not particularly limited, but may be approximately 0.5 mm to 5 mm, preferably 1 mm to 3 mm, and more preferably 2.0 to 2.3 mm.

A laminated glass including an nλ/4 retardation film as an interlayer may be formed through a normal laminated glass producing step after formation of the nλ/4 retardation film on a surface of a glass plate. In this case, the nλ/4 retardation film may be bonded to the glass plate using an adhesive.

In addition, the laminated glass including an n$\lambda$/4 retardation film as an interlayer may be formed by using a laminated intermediate film sheet for a laminated glass including an n$\lambda$/4 retardation film as an intermediate film sheet and performing the above-described heating treatment and pressurizing treatment. The laminated intermediate film sheet for a laminated glass including an n$\lambda$/4 retardation film can be formed by bonding the n$\lambda$/4 retardation film to a surface of a known intermediate film sheet. Otherwise, the n$\lambda$/4 retardation film can be formed to be interposed between two known intermediate film sheets. The two intermediate film sheets may be the same or different from each other. The two intermediate film sheets are preferably the same.

As the intermediate film sheet, for example, a resin film including a resin selected from the group consisting of polyvinyl butyral (PVB), an ethylene-vinyl acetate copolymer, and a chlorine-containing resin can be used. The resin is preferably a main component of the intermediate film sheet. The main component means a component which makes up 50 mass % or greater of the intermediate film sheet. Among the resins, polyvinyl butyral or an ethylene-vinyl acetate copolymer is preferable, and polyvinyl butyral is more preferable. The resin is preferably a synthetic resin.

Polyvinyl butyral can be obtained by acetalizing polyvinyl alcohol with butyraldehyde. The lower limit of the acetalization degree of the polyvinyl butyral is preferably 40%, and more preferably 60%. The upper limit of the acetalization degree of the polyvinyl butyral is preferably 85%, and more preferably 75%.

The polyvinyl butyral can be prepared by acetalizing polyvinyl alcohol with butyraldehyde. In general, polyvinyl alcohol is obtained by saponifying polyvinyl acetate, and polyvinyl alcohol having a saponification degree of 80 to 99.8 mol % is generally used.

The lower limit of the polymerization degree of the polyvinyl alcohol is preferably 200, and the upper limit of the polymerization degree of the polyvinyl alcohol is preferably 3000. In a case where the polymerization degree is less than 200, penetration resistance of a laminated glass to be obtained may be reduced, and in a case where the polymerization degree is greater than 3000, formability of the resin film deteriorates, and stiffness of the resin film excessively increases. Thus, workability may deteriorate. The lower limit of the polymerization degree is more preferably 500, and the upper limit of the polymerization degree is more preferably 2000.

For bonding between the n$\lambda$/4 retardation film and the intermediate film sheet, a known bonding method can be used, and a lamination treatment is preferably used. In a case where the lamination treatment is performed, the lamination treatment is preferably performed in a state heated and pressurized to some extent such that the n$\lambda$/4 retardation film and the intermediate film sheet are not peeled off after processing.

In order to stably perform the lamination, the film surface temperature on the adhesion side of the intermediate film sheet is preferably 50° C. to 130° C., and more preferably 70° C. to 100° C.

Pressurization is preferably performed during the lamination. The pressurization condition is preferably less than 2.0 kg/cm$^2$ (0.196 MPa), more preferably in a range of 0.5 to 1.8 kg/cm$^2$ (0.049 to 0.176 MPa), and even more preferably in a range of 0.5 to 1.5 kg/cm$^2$ (0.049 to 0.147 MPa).

<Adhesive Layer>

The mirror with an image display function according to the present invention may include an adhesive layer for adhesion between the reflection layer and the n$\lambda$/4 retardation film, between the n$\lambda$/4 retardation film and the front surface plate, between the image display device and the reflection layer, between ¼ wavelength plate and the linear polarization reflection plate, and between other respective layers. The adhesive layer may be formed from an adhesive.

Adhesives are classified into hot-melt types, thermosetting types, photocurable types, reaction-curable types, and pressure-sensitive types which do not require curing from the viewpoint of curing method. As the materials of these adhesives, it is possible to use compounds based on acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, polyvinyl butyral, or the like. From the viewpoint of workability and productivity, photocuring is preferable as the curing method. From the viewpoint of optical transparency and heat resistance, materials based on acrylate, urethane acrylate, epoxy acrylate, or the like are preferably used.

<Method of Producing Half Mirror>

The half mirror may be produced according to procedures based on the method of manufacturing a reflection layer to be used. A half mirror having a front surface plate may be produced by forming an n$\lambda$/4 retardation film and a reflection layer on the front surface plate, or by adhering an n$\lambda$/4 retardation film and a reflection layer produced separately to the front surface plate. For example, a cholesteric circular polarization reflection layer, or a ¼ wavelength plate and a cholesteric circular polarization reflection layer formed on a temporary support may be transferred to the n$\lambda$/4 retardation film to produce a half mirror. For example, a cholesteric liquid crystal layer or a laminate of cholesteric liquid crystal layers can be formed on a temporary support to form a cholesteric circular polarization reflection layer, a surface of the circular polarization reflection layer can be adhered to the n$\lambda$/4 retardation film, and if necessary, the temporary support can be peeled off to obtain a half mirror. Otherwise, a ¼ wavelength plate and a cholesteric liquid crystal layer can be sequentially formed on a temporary support to form a laminate of the ¼ wavelength plate and the cholesteric circular polarization reflection layer, a surface of the cholesteric liquid crystal layer (circular polarization reflection layer) can be adhered to the n$\lambda$/4 retardation film, and if necessary, the temporary support can be peeled off to obtain a half mirror.

A half mirror of a laminated glass, including an n$\lambda$/4 retardation film and a reflection layer as interlayers, can be manufactured in the same manner as in the case of the laminated glass including an n$\lambda$/4 retardation film as an interlayer. For example, an n$\lambda$/4 retardation film and a reflection layer may be formed on a surface of a glass plate, and then a normal laminated glass producing step may be performed to manufacture a half mirror. Otherwise, a laminated intermediate film sheet for a laminated glass including an n$\lambda$/4 retardation film and a reflection layer may be used as an intermediate film sheet to manufacture a half mirror. The laminated intermediate film sheet for a laminated glass including an n$\lambda$/4 retardation film and a reflection layer can be formed by bonding the n$\lambda$/4 retardation film and the reflection layer to a surface of a known intermediate film sheet. The laminated intermediate film sheet for a laminated glass can also be formed by interposing the n$\lambda$/4 retardation film and the reflection layer between two known intermediate film sheets. In the half mirror of a laminated glass, the nλ/4 retardation film and the reflection layer may be in direct contact with each other, or may be adhered via an adhesive layer.

<<<Method of Manufacturing Mirror with Image Display Function>>>

The mirror with an image display function according to the present invention is produced in such a manner that the reflection layer side of a half mirror with respect to the nλ/4 retardation film is on the image display portion surface side of the image display device. In a case where the half mirror has a front surface plate, the image display device, the reflection layer, the nλ/4 retardation film, and the front surface plate are disposed in this order. Then, if necessary, the image display device and the half mirror may be integrally formed.

The integral formation of the image display device with the half mirror may be performed through connection in an outer frame or a hinge, or adhesion.

EXAMPLES

Hereinafter, the present invention will be described in more detail with reference to examples. The materials, the reagents, the amounts of materials, the proportions thereof, the operations, and the like which will be shown in the following examples can be appropriately modified within a range not departing from the gist of the present invention. Accordingly, the scope of the present invention is not limited to the following examples.

<Preparation of Coating Liquid>

(1) A coating liquid 1 for a ¼ wavelength plate and a retardation plate and coating liquids 2, 3, and 4 for forming a cholesteric liquid crystal layer were prepared with compositions shown in the following Table 1.

TABLE 1

| Type | Material Name (manufacturer) | Coating Liquid 1 (1/4 wavelength plate and retardation plate) | Coating Liquid 2 (630 nm) | Coating Liquid 3 (540 nm) | Coating Liquid 4 (450 nm) |
|---|---|---|---|---|---|
| Rod-Like Liquid Crystal Compound | The following compound 1 | 100 parts by mass | 100 parts by mass | 100 parts by mass | 100 parts by mass |
| Chiral Agent for Right-Twist | PALIOCOLOR LC756 (BASF SE) | none | 4.7 parts by mass | 5.5 parts by mass | 6.7 parts by mass |
| Polymerization Initiator | Irgacure 819 (BASF SE) | 4 parts by mass | 4 parts by mass | 4 parts by mass | 4 parts by mass |
| Alignment Control Agent | The following compound 2 | 0.1 parts by mass | 0.1 parts by mass | 0.1 parts by mass | 0.1 parts by mass |
| Crosslinking Agent | A-TMMT (SHIN-NAKAMURA CHEMICAL CO, LTD.) | 1 part by mass | 1 part by mass | 1 part by mass | 1 part by mass |
| Solvent | 2-Butanone (Wako Pure Chemical Industries, Ltd.) | 170 parts by mass | 170 parts by mass | 170 parts by mass | 170 parts by mass |

Rod-Like Liquid Crystal Compound: Compound 1

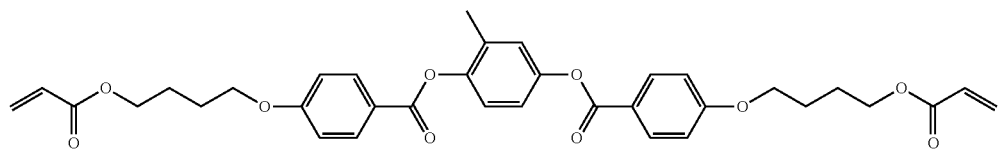 [SMILES: C=CC(=O)OCCCCOc1ccc(C(=O)Oc2ccc(OC(=O)c3ccc(OCCCCOC(=O)C=C)cc3)c(C)c2)cc1]

Alignment Control Agent: Compound 2

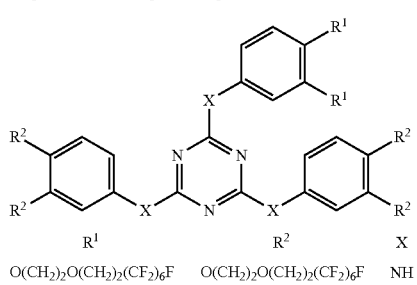

| $R^1$ | $R^2$ | X |
|---|---|---|
| $O(CH_2)_2O(CH_2)_2(CF_2)_6F$ | $O(CH_2)_2O(CH_2)_2(CF_2)_6F$ | NH |

The compound 2 was manufactured by a method described in JP2005-99248A.

<Production of Cholesteric Circular Polarization Reflection Layer>

(1) A PET film (COSMOSHINE A4100, thickness: 100 μm) manufactured by TOYOBO CO., LTD. was used as a temporary support (280 mm×85 mm) and rubbed (rayon cloth, pressure: 0.1 kgf (0.98 N), rotation speed: 1000 rpm, transport speed: 10 m/min, number of times: one reciprocation).

(2) The rubbed surface of the PET film was coated with the coating liquid 1 using a wire bar. After that, the film was dried, and then put on a hot plate at 30° C. The film was irradiated with UV light for 6 seconds by an electrodeless lamp "D-BULB" (60 mW/cm$^2$) manufactured by HERAEUS to fix the liquid crystalline phase, and thus a ¼ wavelength plate having a thickness of 0.8 μm was obtained. A surface of the obtained layer was coated with the coating liquid 2 using a wire bar. Then, the film was dried, and then put on a hot plate at 30° C. The film was irradiated with UV light for 6 seconds by an electrodeless lamp "D-BULB" (60 mW/cm$^2$) manufactured by HERAEUS to fix the cholesteric liquid crystalline phase, and thus a cholesteric liquid crystal layer having a thickness of 3.5 μm was obtained. The same steps were repeated using the coating liquids 3 and 4 in this order, thereby obtaining a laminate A of the ¼ wavelength plate and the three cholesteric liquid crystal layers (layer of coating liquid 3: 3.0 μm, layer of coating liquid 4: 2.7 μm). The transmission spectrum of the laminate A was measured using a spectrophotometer (manufactured by JASCO Corporation, V-670), and a transmission spectrum having a reflection peak at 630 nm, 540 nm, and 450 nm was obtained.

<Production of Reflection-Type Linear Polarizing Plate>

PEN and copolyester (coPEN) of naphthalate (70) and terephthalate (30) were synthesized using an ethylene glycol as a diol in a standard polyester resin synthesis pot based on a method described in JP1997-506837A (JP-H9-506837A). A single layer film of PEN and coPEN was formed by extrusion molding, and then stretched at a stretching ratio of 5:1 at approximately 150° C. The refractive index of PEN associated with an alignment axis was confirmed to be approximately 1.88, the refractive index of PEN associated with a crossing axis was confirmed to be 1.64, and the refractive index of the coPEN film was confirmed to be approximately 1.64.

Next, coextrusion was performed using a 50-slot supply block in which a standard extrusion die was supplied, and thus alternate layers of PEN and coPEN, each having a thickness as shown in the following Table 2, were formed. By repeating the above procedures, layers (1) to (5) of Table 2 were formed in order to laminate total 250 layers. Then, the stretched films were thermally cured for 30 seconds at approximately 230° C. in an air oven to obtain a laminate B.

TABLE 2

|  | (1) | (2) | (3) | (4) | (5) |
|---|---|---|---|---|---|
| PEN | 63.4 nm | 71.5 nm | 79.6 nm | 87.7 nm | 95.8 nm |
| coPEN | 68.5 nm | 77.2 nm | 86.0 nm | 94.7 nm | 103.5 nm |

<Production of Retardation Plate>

(1) A PET film (COSMOSHINE A4100, thickness: 100 μm) manufactured by TOYOBO CO., LTD. was used as a temporary support and rubbed (rayon cloth, pressure: 0.1 kgf (0.98 N), rotation speed: 1000 rpm, transport speed: 10 m/min, number of times: one reciprocation).

The rubbed surface of the PET film was coated with the coating liquid 1 using a wire bar. After that, the film was dried, and then put on a hot plate at 30° C. The film was irradiated with UV light for 6 seconds by an electrodeless lamp "D-BULB" (60 mW/cm$^2$) manufactured by HERAEUS to fix the liquid crystalline phase. Using a pressure sensitive sheet (PDS-1) manufactured by PANAC Corporation, the film was bonded to an acrylic plate (thickness: 0.3 mm), and then the temporary support was peeled off to obtain a retardation plate A. Retardation plates B to D were obtained in the same manner, except that the thickness was changed as shown in the following Table 3. The front phase differences of the obtained retardation plates were measured using AxoScan manufactured by Axometrics, Inc. The results are shown in Table 3.

TABLE 3

|  | Functional Layer Thickness [μm] | Re [nm] |
|---|---|---|
| Retardation Plate A | 0.8 | 138 |
| Retardation Plate B | 1.6 | 275 |
| Retardation Plate C | 2.4 | 413 |
| Retardation Plate D | 3.2 | 550 |

<Production of Half Mirror>

Example 1

A liquid crystal surface of the retardation plate A was bonded to a glass plate having a thickness of 1.8 mm using a pressure sensitive sheet (PDS-1) manufactured by PANAC Corporation.

Next, a surface of the cholesteric liquid crystal layer of the laminate A was coated with an adhesive LCR0631 manufactured by TOAGOSEI CO., LTD. using a wire bar, and then bonded to a surface of the acrylic plate of the retardation plate A using a laminator. In this case, these were disposed such that the angle between the slow axis of the ¼ wavelength plate of the laminate A and the slow axis of the retardation plate A was 90°. Furthermore, the count of the wire bar and the nip roll pressure of the laminator were adjusted, and the thickness of the adhesive layer was adjusted to 2 μm. Then, the laminate was put on a hot plate at 50° C. and irradiated with UV light for adhesion for 30 seconds by an electrodeless lamp "D-BULB" (60 mW/cm$^2$) manufactured by HERAEUS. Thereafter, the PET film was peeled off and a half mirror of Example 1 was obtained.

Example 2

A half mirror of Example 2 was obtained in the same manner as in Example 1, except that the retardation plate C was used in place of the retardation plate A.

Example 3

A half mirror of Example 3 was obtained in the same manner as in Example 1, except that the laminate B was used in place of the laminate A and bonded to the retardation plate A such that the slow axis of the retardation plate A was inclined with respect to the transmission axis of the laminate B by 45°.

Example 4

A half mirror of Example 4 was obtained in the same manner as in Example 3, except that the retardation plate C was used in place of the retardation plate A.

Comparative Example 1

A half mirror of Comparative Example 1 was obtained in the same manner as in Example 1, except that the retardation plate A was not used.

Comparative Example 2

A half mirror of Comparative Example 2 was obtained in the same manner as in Example 1, except that the retardation plate B was used in place of the retardation plate A.

Comparative Example 3

A half mirror of Comparative Example 3 was obtained in the same manner as in Example 1, except that the retardation plate D was used in place of the retardation plate A.

Comparative Example 4

A half mirror of Comparative Example 4 was obtained in the same manner as in Example 3, except that the retardation plate A was not used.

Comparative Example 5

A half mirror of Comparative Example 5 was obtained in the same manner as in Example 3, except that the retardation plate B was used in place of the retardation plate A.

<Production of Mirror with Image Display Function>

The half mirror produced in the above description was adhered to a surface of an image display portion of an image display device (iPad (registered trade name) Retina) to produce a mirror with an image display function such that the glass plate, the retardation plate, the reflection layer, and the image display device were provided in this order. In this case, in the examples and the comparative examples using the laminate A, the slow axis of the ¼ wavelength plate of the reflection layer was inclined with respect to the transmission axis of the image display device (polarization direction of light emitted from LCD) by an angle of 45 degrees.

<Evaluation Method>

The mirror with an image display function produced in the above description was attached to a position of an inner mirror of a vehicle (vehicle type: STEPWAGON (registered trade name) 2002 manufactured by Honda Motor Co., Ltd.) such that the glass plate was disposed closest to the driver's seat side (observer side). An image and a mirror-reflected image of the mirror with an image display function which could be confirmed by an observer in the driver's seat in a state in which sunlight was incident on the position of the inner mirror from a rear glass of the vehicle were used for evaluation based on the following standards. The results are shown in Table 4.

[Image]
A: Bright image with no distortion
B: Image with distortion or brightness unevenness, or image which is dark as a whole

[Unevenness (Derived from Birefringence of Rear Glass in Mirror-Reflected Image)]
A: Diagonal brightness unevenness of light is not substantially visually confirmed.
B: Diagonal brightness unevenness of light can be visually confirmed.

From the results shown in Table 4, it was found that the unevenness derived from the birefringence of the rear glass in the mirror-reflected image was rarely visually confirmed in Examples 1 to 4 using the $n\lambda/4$ retardation film.

TABLE 4

| | | Retardation Plate | | Evaluation | |
|---|---|---|---|---|---|
| | Reflection Layer | Type | Re | Image | Unevenness in Mirror-Reflected Image |
| Example 1 | Laminate A | Retardation Plate A | 138 | A | A |
| Example 2 | Laminate A | Retardation Plate C | 413 | A | A |
| Example 3 | Laminate B | Retardation Plate A | 138 | A | A |
| Example 4 | Laminate B | Retardation Plate C | 413 | A | A |
| Comparative Example 1 | Laminate A | None | — | A | B |
| Comparative Example 2 | Laminate A | Retardation Plate B | 275 | A | B |
| Comparative Example 3 | Laminate A | Retardation Plate D | 550 | A | B |
| Comparative Example 4 | Laminate B | None | — | A | B |
| Comparative Example 5 | Laminate B | Retardation Plate B | 275 | A | B |

What is claimed is:

1. A vehicle mirror with an image display function comprising:
   a half mirror; and
   an image display device,
   wherein the half mirror includes an $n\lambda/4$ retardation film and a reflection layer,
   n is 1, 3, 5, or 7,
   the $n\lambda/4$ retardation film, the reflection layer, and the image display device are disposed in this order in the mirror with an image display function, and
   the reflection layer is a circular polarization reflection layer.

2. The vehicle mirror with an image display function according to claim 1,
   wherein n is 1 or 3.

3. The vehicle mirror with an image display function according to claim 1,
   wherein the circular polarization reflection layer includes a polymerized cholesteric liquid crystal layer.

4. The vehicle mirror with an image display function according to claim 3,
   wherein the circular polarization reflection layer includes three or more polymerized cholesteric liquid crystal layers.

5. The vehicle mirror with an image display function according to claim 3, further comprising:
   a ¼ wavelength plate,
   wherein the half mirror includes the $n\lambda/4$ retardation film, the circular polarization reflection layer, and the ¼ wavelength plate in this order.

6. The vehicle mirror with an image display function according to claim 5,
wherein the circular polarization reflection layer and the ¼ wavelength plate are in direct contact with each other.

7. The vehicle mirror with an image display function according to claim 1,
wherein the half mirror includes a front surface plate, and
the front surface plate, the $n\lambda/4$ retardation film, and the reflection layer are provided in this order.

8. The vehicle mirror with an image display function according to claim 1,
wherein the half mirror includes a front surface plate,
the front surface plate is a laminated glass including two glass plates and an interlayer between the two glass plates, and
the interlayer includes the $n\lambda/4$ retardation film.

9. The vehicle mirror with an image display function according to claim 1,
wherein the half mirror is a laminated glass including two glass plates and an interlayer between the two glass plates, and
the interlayer includes the $n\lambda/4$ retardation film and the reflection layer.

10. A vehicle mirror with an image display function comprising:
a half mirror; and
an image display device,
wherein the half mirror includes an $n\lambda/4$ retardation film and a reflection layer,
n is 3, 5, or 7,
the $n\lambda/4$ retardation film, the reflection layer, and the image display device are disposed in this order in the mirror with an image display function, and
the reflection layer is a linear polarization reflection layer or a circular polarization reflection layer.

11. The vehicle mirror with an image display function according to claim 10,
wherein n is 3.

12. The vehicle mirror with an image display function according to claim 10,
wherein the half mirror includes a front surface plate, and
the front surface plate, the $n\lambda/4$ retardation film, and the reflection layer are provided in this order.

13. The vehicle mirror with an image display function according to claim 10,
wherein the half mirror includes a front surface plate,
the front surface plate is a laminated glass including two glass plates and an interlayer between the two glass plates, and
the interlayer includes the $n\lambda/4$ retardation film.

14. The vehicle mirror with an image display function according to claim 10,
wherein the half mirror is a laminated glass including two glass plates and an interlayer between the two glass plates, and
the interlayer includes the $n\lambda/4$ retardation film and the reflection layer.

* * * * *